United States Patent [19]

Gopp et al.

[11] Patent Number: 4,971,007
[45] Date of Patent: Nov. 20, 1990

[54] SYSTEM AND METHOD FOR COMBINED KNOCK AND TORQUE TIMING CONTROL

[75] Inventors: Alexander Y. Gopp, Ann Arbor; Stephen W. Hoffman, Riverview, both of Mich.

[73] Assignee: Ford Motor Company, Dearborn, Mich.

[21] Appl. No.: 517,466

[22] Filed: Apr. 19, 1990

Related U.S. Application Data

[63] Continuation of Ser. No. 412,234, Sep. 25, 1989, abandoned.

[51] Int. Cl.$^5$ ............................................. F02P 5/10
[52] U.S. Cl. ................................ 123/425; 364/431.08
[58] Field of Search ............... 123/416, 417, 425, 435; 364/431.08

[56] References Cited

U.S. PATENT DOCUMENTS

| | | | |
|---|---|---|---|
| 4,002,155 | 1/1977 | Harned et al. | 123/425 |
| 4,120,272 | 10/1978 | Douaud et al. | 123/425 |
| 4,261,313 | 4/1981 | Iwata et al. | 123/425 |
| 4,274,379 | 6/1981 | Iwata et al. | 123/425 |
| 4,466,405 | 8/1984 | Hattori et al. | 123/416 |
| 4,612,902 | 9/1986 | Abe et al. | 123/425 |
| 4,727,842 | 3/1988 | Takahashi | 123/425 |
| 4,790,281 | 12/1988 | Mieno et al. | 123/425 |
| 4,809,662 | 3/1989 | McDougal et al. | 123/425 |
| 4,844,027 | 7/1989 | Nakamura | 123/425 |
| 4,858,580 | 8/1989 | Kamise et al. | 123/425 |
| 4,899,710 | 2/1990 | Takahashi | 123/425 |

FOREIGN PATENT DOCUMENTS 1185499  3/1970  United Kingdom .

Primary Examiner—Willis R. Wolfe
Attorney, Agent, or Firm—Allan J. Lippa; Peter Abolins

[57] ABSTRACT

An ignition control system for controlling ignition knock while maintaining minimum spark for best torque (MBT). Both knock control and MBT control are simultaneously utilized. During knock control, engine cycles are counted between successive knock detections. When the count is less than a first value, a retard signal is generated. An advance signal is generted when the count is greater than a second predetermined value. These retard and advance signals are accumulated as knock trim signals in RAM storage locations as a function of engine speed and load operating points for each cylinder. During MBT control, MBT trim signals are generated by determining convergence of an average difference in indicated mean effective pressure for each cylinder. These MBT trim signals are stored in another RAM as a function of speed and load operating points. Base ignition timing is then corrected by both the knock trim signal and corresponding MBT trim signal at each speed and load operating point.

13 Claims, 7 Drawing Sheets

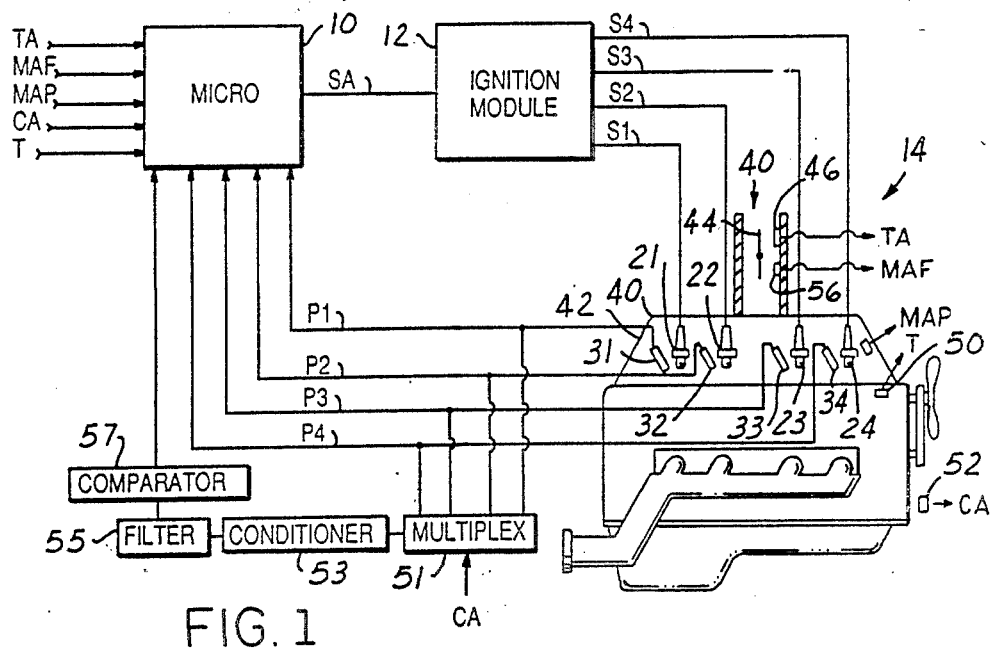
FIG.1
FIG.2
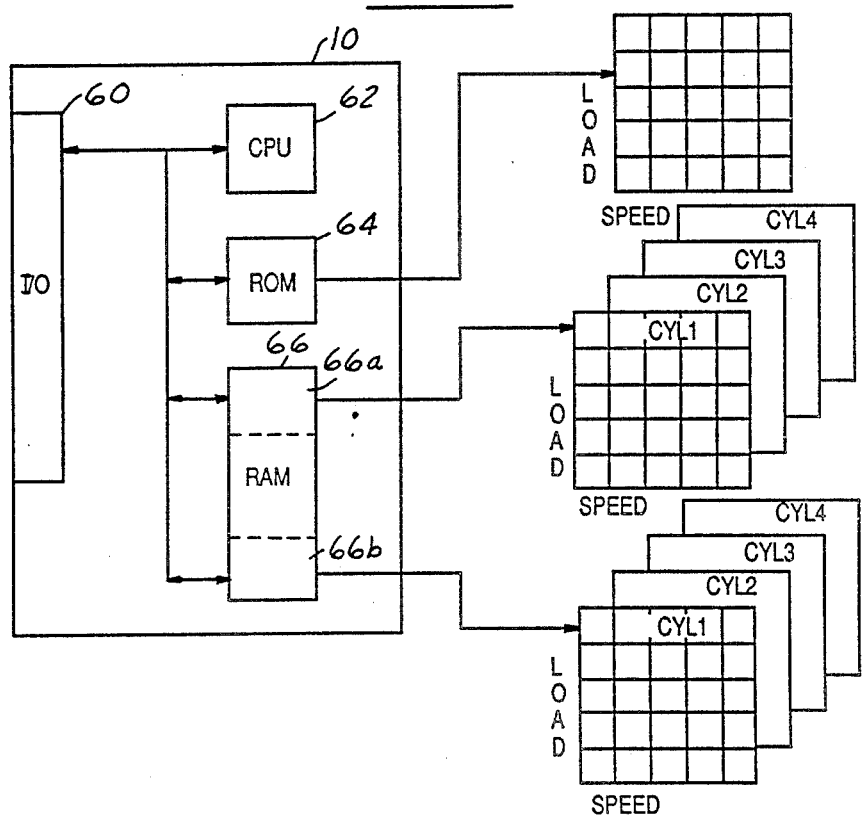

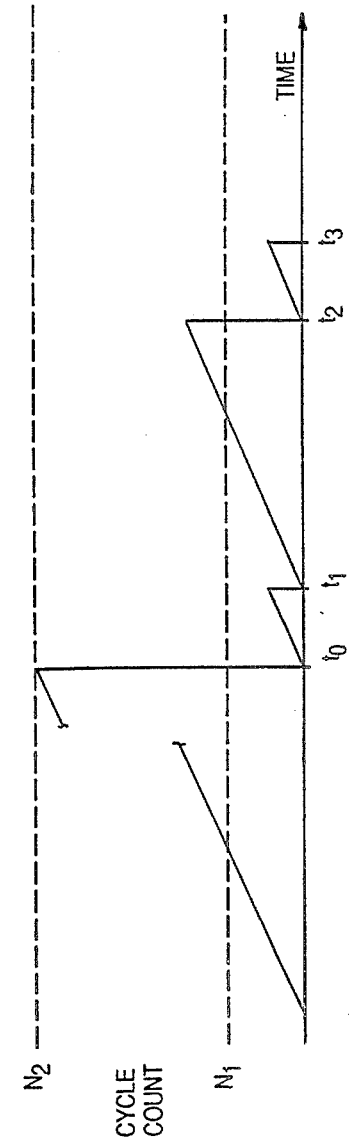

SYSTEM AND METHOD FOR COMBINED KNOCK AND TORQUE TIMING CONTROL

This application is a continuation of application Ser. No. 412,234, filed Sept. 25, 1989, now abandoned.

BACKGROUND OF THE INVENTION

The field of the invention relates to ignition timing systems with knock control. In particular, the invention relates to ignition systems having both minimum spark for best torque (MBT) ignition control and knock control accomplished on an individual cylinder basis.

Optimal torque output is achieved when ignition timing of an engine is set at MBT. The ignition timing of a particular model of motor vehicle is typically set or calibrated at a predefined spark advance before top dead center (TDC) such that the average of all such vehicles, when new, is near MBT. This general approach has been found to be less than optimal for two basic reasons. First, vehicle calibrators are forced to set ignition timing at a value appreciably less than MBT to avoid knocking under certain operating conditions. Second, variations among engines, subsequent maintenance, environmental conditions, and aging often result in an actual MBT which is different from the initial spark advance calibration or reference MBT.

Knock control systems are known wherein ignition timing is retarded a predetermined increment upon each and every detection of knock. When knock does not occur, ignition timing is typically advanced a smaller increment to allegedly hunt for an optimal ignition timing. A disadvantage of such systems is that each occurrence of a knock results in ignition retarding. This has been recognized to be a less than optimal solution because optimal torque output is typically achieved with occasional knocking referred to as trace knock. Thus, these systems tend to excessively retard ignition timing resulting in less efficient engine operation. Another disadvantage of these systems is that in the absence of knock, ignition timing is only advanced back to the original reference value. Stated another way, these systems do not determine and achieve an actual MBT value.

Recognizing the above disadvantage of retarding upon each detection of knock, a number of approaches utilize a frequency of knock detection. More specifically, a predetermined time interval is generated by counting a predetermined number of engine cycles, such as 1,000 cycles. The number of knock detections during this predetermined number of engine cycles is then counted and compared to a reference value. Examples of these approaches are found in U.S. Pat. No. 4,120,272 issued to Douaud et al, U.S. Pat. No. 4,002,155 issued to Harned et al, U.S. Pat. Nos. 4,261,313 and 4,274,379 issued to Iwata et al. The inventor herein has recognized a disadvantage of slow response time inherent in the above approaches. More specifically, a timing correction cannot be made until the predetermined number of engine cycles is counted. Thus, under severe knocking conditions, excessive time may elapse before a knock correction is made resulting in serious engine damage. Another disadvantage of the above approaches, is that ignition timing is only advanced back to the best guess or reference value of MBT. Actual MBT control is not disclosed.

U.S. Pat. No. 4,466,405 issued to Hattori et al discloses an ignition timing system having both knock control and MBT control. Like the approaches described above, the '405 patent discloses a frequency of knock detection by counting the occurrences of knock during a predetermined number of engine cycles. Knock trim values are read into a random access memory (RAM) as a function of speed and load. Independently generated MBT values are also read into the same RAM. The inventor herein has recognized numerous disadvantages in the disclosure of '405 patent. As in the case of the approaches described above, knock corrections cannot be made until a predetermined number of engine cycles are counted. The resulting slow response time may cause engine damage under some operating conditions. A further disadvantage, is that MBT and knock control cannot be concurrently conducted. Accordingly, approaches of this nature may tend to hunt, or oscillate, around the timing reference.

SUMMARY OF THE INVENTION

An object of the invention described herein is to provide an ignition timing system with both MBT and knock control which offers optimal response time and stability for each cylinder.

The above object is achieved, and disadvantages of prior approaches overcome, by providing both a method and a system for controlling ignition timing in a combustion chamber of an internal combustion engine. In one particular aspect of the invention, the method comprises the steps of: indicating knock occurrence in the combustion chamber; generating base ignition timing to create an ignition spark within the combustion chamber; providing a count of combustion events in the combustion chamber between two successive knock occurrences; retarding the base ignition timing by a first predetermined increment when the count is less than a first predetermined count; and advancing the base ignition timing by a second predetermined increment when the count is greater than a second predetermined count.

An advantage of the above aspect of the invention is that a faster knock control response is provided than was heretofore possible. More specifically, by making decisions in response to a count of engine cycles between two successive knock occurrences, faster decisions are made than heretofore possible.

In another aspect of the invention, the system comprises: detecting means for detecting knock in the combustion chamber; first storage means for storing a plurality of base ignition timing signals corresponding to an equal plurality of engine speed and load operating points; trimming means for optimizing torque output of the combustion chamber by providing MBT trim signals in response to a measurement of combustion pressure at each of the speed and load operating points; second storage means for storing each of the MBT trim signals in storage locations corresponding to the speed and load operating points; control means for counting combustion events between two successive knock detections at each of the speed and load operating points, the control means providing a retard signal when the count is less than a first predetermined count and providing an advance signal when the count is greater than a second predetermined count; an accumulator for each of the speed and load operating points, each of the accumulators being incremented by the retard signal and decremented by the advance signal to generate an accumulated knock trim signal; and ignition means for providing the ignition timing to the combustion chamber at each of the speed and load operating points by combining one of the base timing signals from the first storage means and a corresponding one of the MBT trim signals from the second storage means and a corresponding one of the accumulated knock trim signals from a corresponding one of the accumulators. Preferably, the trimming means is disabled when the knock trim value is greater than zero.

By counting engine cycles between two successive knock events, rather than simply counting a predetermined number of engine cycles as in prior approaches, an advantage of providing a faster response time than heretofore possible is obtained. Another advantage is that concurrent MBT and knock control are provided through two separate memories thereby providing an advantage of eliminating ignition timing hunting and oscillation which were inherent in other approaches. Another advantage obtained is that knock corrections are immediately applied upon entering a knock limited region. More specifically, storing knock trim values as a function of speed and load points enables immediate correction upon entering engine operating conditions which had previously incurred knocking conditions.

DESCRIPTION OF THE DRAWINGS

The objects and advantages described above are better understood by reading an example of an embodiment in which the invention is used to advantage, referred to as the Description of the Preferred Embodiment, with reference to the drawings wherein:

FIG. 1 is a block diagram of a system in which the invention is used to advantage;

FIG. 2 is a representation of a microcomputer shown in FIG. 1 illustrating various memories or look up tables;

FIGS. 6A–6F are a graphical representation of various process steps performed by the microcomputer shown in FIG. 1 and 2 for MBT control;

DESCRIPTION OF THE PREFERRED EMBODIMENT

Figure 3:
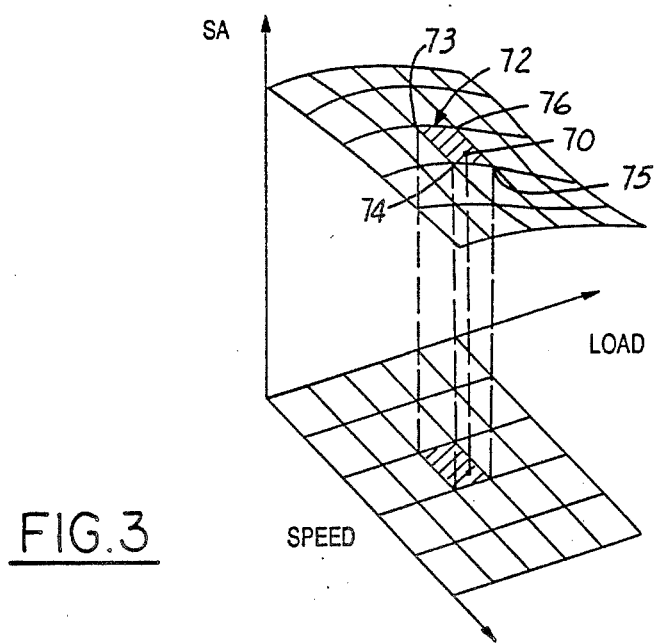
FIG. 3 is a graphical representation of the look up tables associated with the illustration in FIG. 2.
Figure 9:
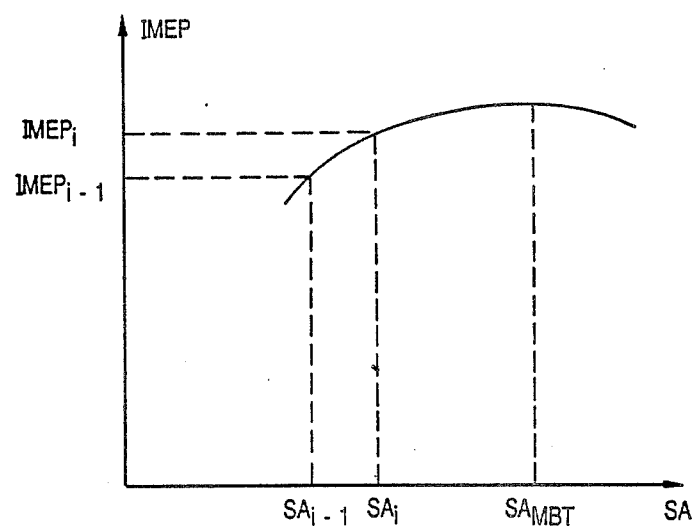
FIG. 9 is a graphical representation of IMEP vs spark advance presented to help illustrate operation of MBT control.

An example of an embodiment in which the invention claimed herein is used to advantage is now described with reference to the attached figures. Referring first to FIG. 1, microcomputer 10 is shown controlling ignition module 12 in response to various measurements from engine 14. In this particular example, engine 14 is shown as a conventional 4 cylinder gasoline engine having spark plugs 21, 22, 23, and 24 each receiving electrical energy via respective signals $S_1$, $S_2$, $S_3$, and $S_4$ from ignition module 12. Each of the spark plugs 21, 22, 23, and 24 is coupled in a conventional manner to respective combustion cylinders 1, 2, 3, and 4 (not shown).

Pressure transducers 31, 32, 33, and 34 provide microcomputer 10 with pressure signals $P_1$, $P_2$, $P_3$, and $P_4$ each related to the actual pressure in respective combustion cylinders 1, 2, 3, and 4. Air intake 40 is shown coupled to intake manifold 42 for inducting air past throttle plate 44 into the combustion cylinders.

Various sensors are shown coupled to engine 14 for providing microcomputer 10 with measurements of engine operating conditions. More specifically, throttle angle sensor 46 is shown coupled to throttle plate 44 for providing throttle angle signal TA. Manifold pressure sensor 48 is shown coupled to intake manifold 42 for providing manifold absolute pressure (MAP) signal related to the manifold pressure in intake manifold 42. Temperature sensor 50 is shown coupled to engine 14 for providing temperature signal T. Crank angle sensor 52 is shown coupled to engine 14 for providing crank angle signal CA related to crankshaft position. Mass air flow sensor 56 is shown coupled to air intake 40 for providing mass air flow signal MAF related to the mass air flow inducted into engine 14. Those skilled in the art will recognize that either MAP sensor 48 or MAF sensor 56 may be used to provide an indication of engine load by known techniques.

Pressure signals P1, P2, P3, and P4 are time multiplexed via multiplexer 51 in response to signal CA. Stated another way, the output of multiplexer 51 is a serial representation of signals P1–P4, each represented during a different crank angle time slot. Signal conditioning is then provided by conditioner 53 which is a conventional current charged operational amplifier in this example. The time division multiplexed pressure signals are then filtered in filter 55 which is a high frequency band pass filter for filtering noise from the pressure signals in this particular example. Pressure variations, which are indicative of knock, are compared to a threshold value in comparator 57 for providing knock indications to microcomputer 10. These knock indications are then correlated with the associated combustion cylinder by conventional demultiplexing in response to signal CA within microcomputer 10.

It is noted that conventional components necessary for engine operation are not shown such as a fuel delivery system (either carbureted or fuel injected). Those skilled in the art will also recognize that the invention may be used to advantage with other types of engines, such as engines having a number of cylinders other than four. It is also recognized that pressure indications for each of the combustion cylinders may be provided by transducers other than pressure transducers 31–34. For example, conventional piezoelectric force ring sensors may be positioned under spark plugs 21–24. Pressure indications may also be provided by sensors coupled to the engine head bolt.

Referring now to FIG. 2 a block diagram of microcomputer 10 is shown including conventional input/output interfaces 60, central processing unit (CPU) 62, read only memory (ROM) 64, and random access memory (RAM) 66. Base or reference ignition timing signals $SA_R$ are permanently stored in ROM 64, as a function of speed and load, for providing base ignition timing at a desired crank angle position before top dead center (TDC). As described in greater detail later herein, RAM 66 is subdivided into RAM 66a and RAM 66b. In this particular example, RAM 66a provides MBT trim signals ($SA_t$) to base ignition timing signals $SA_R$ at corresponding speed and load points for each cylinder. RAM 66b provides knock trim signals ($SA_k$) to base ignition timing signals $SA_R$ at corresponding speed and load points for each cylinder. Engine speed information is calculated from signal CA and load information is calculated from signal MAP by microcomputer 10 in a conventional manner. As described in greater detail later herein, trim signals $SA_t$ are derived from MBT control and knock trim signals $SA_k$ are provided by knock control strategy.

Referring to FIG. 3, a three coordinate graph of a SA v speed v load, applicable to either ROM 64 or RAM 66, is shown. For illustrative purposes, a hypothetical speed v load point (70) is shown within a square (72) defined by four stored SA signals (73, 74, 75, and 76). In response to a particular set of speed and load values (such as represented by point 70) microcomputer 10 calculates a SA signal by interpolation among the four values defined by the surrounding square (such as represented by points 72, 73, 74, and 75).

The process steps performed by microcomputer 10 in controlling ignition timing are now described with with respect to the flowcharts shown in FIGS. 4-8.

Figure 4:
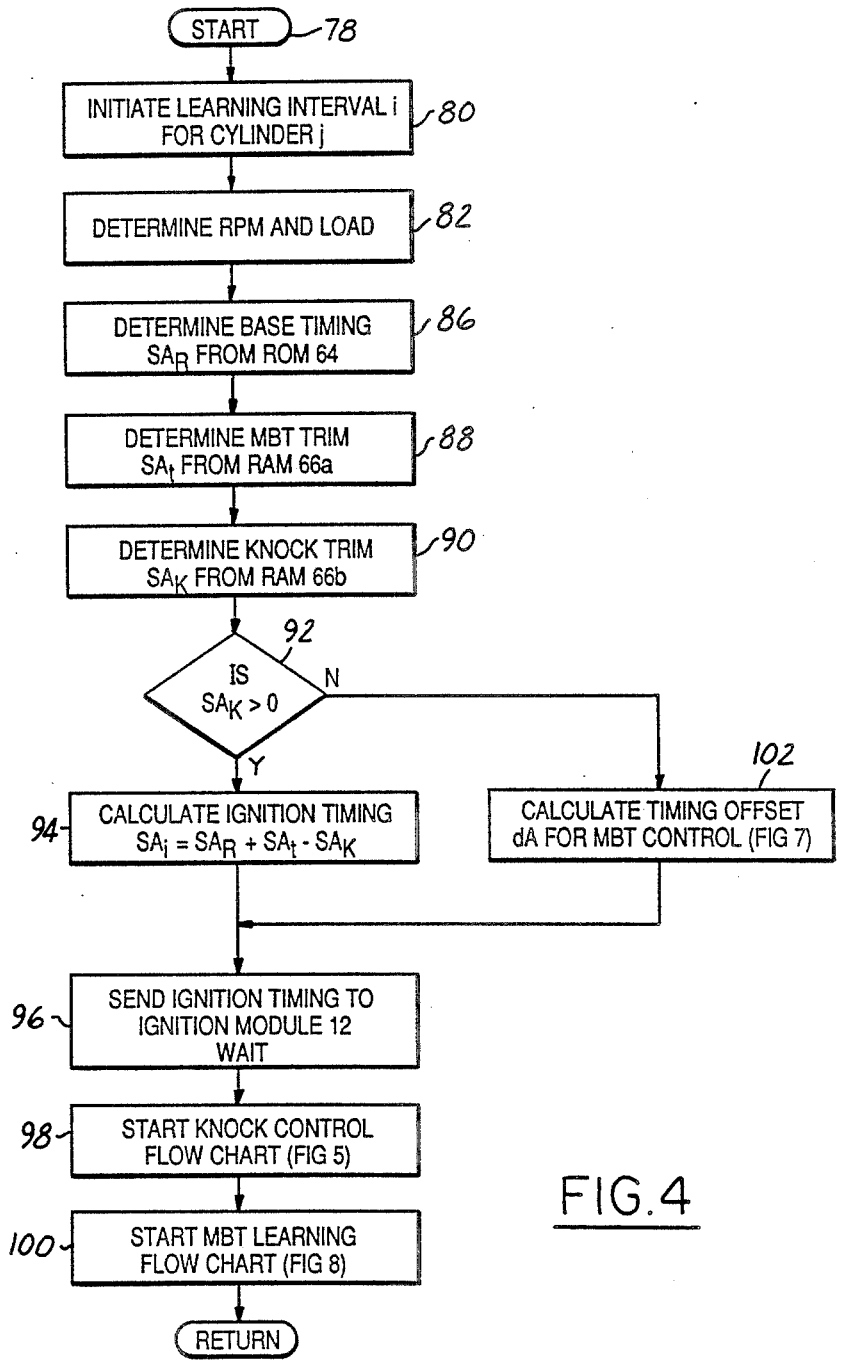
FIG. 4 is a flowchart illustrating the main process steps performed by the microcomputer shown in FIGS. 1 and 2 for both knock and MBT control.

Referring first to FIG. 4, a test or learning interval i for a cylinder j is initiated at the start of each learning cycle, (see steps 78 and 80). Engine speed and load are then computed in a conventional manner from crank angle signal CA and signal MAP (see step 82). During step 86, base or reference ignition timing signal $SA_R$ is retrieved by addressing ROM 64 with the RPM and load values determined in step 82. Similarly, during step 88, MBT trim signals $SA_t$ are retrieved by addressing RAM 66a with the same speed and load values. Knock trim signal $SA_k$ is also retrieved from RAM 66b by addressing it with the same speed and load values (see step 90).

At step 92 a branch occurs in the flowchart. More specifically, when knock trim $SA_k$ is greater than zero, indicating operation in a knock region, MBT control is bypassed and knock control occurs as described with respect to blocks 94, 96, 98, and 100. When knock trim $SA_k$ is equal to zero, both MBT control (see step 102) and knock control occur concurrently. For illustrative purposes, the description precedes at this point assuming that knock trim $SA_k$ is greater than zero. Referring to step 94, ignition timing is updated by adding reference value $SA_R$ with MBT trim value $SA_t$ and subtracting knock trim value $SA_k$. Ignition timing is then coupled to ignition module 12 as shown by step 96. After a time delay sufficient for chamber combustion knock calculations, and IMEP calculations, the knock control strategy ensues as shown by step 98 followed by MBT control in step 100.

Figure 5:
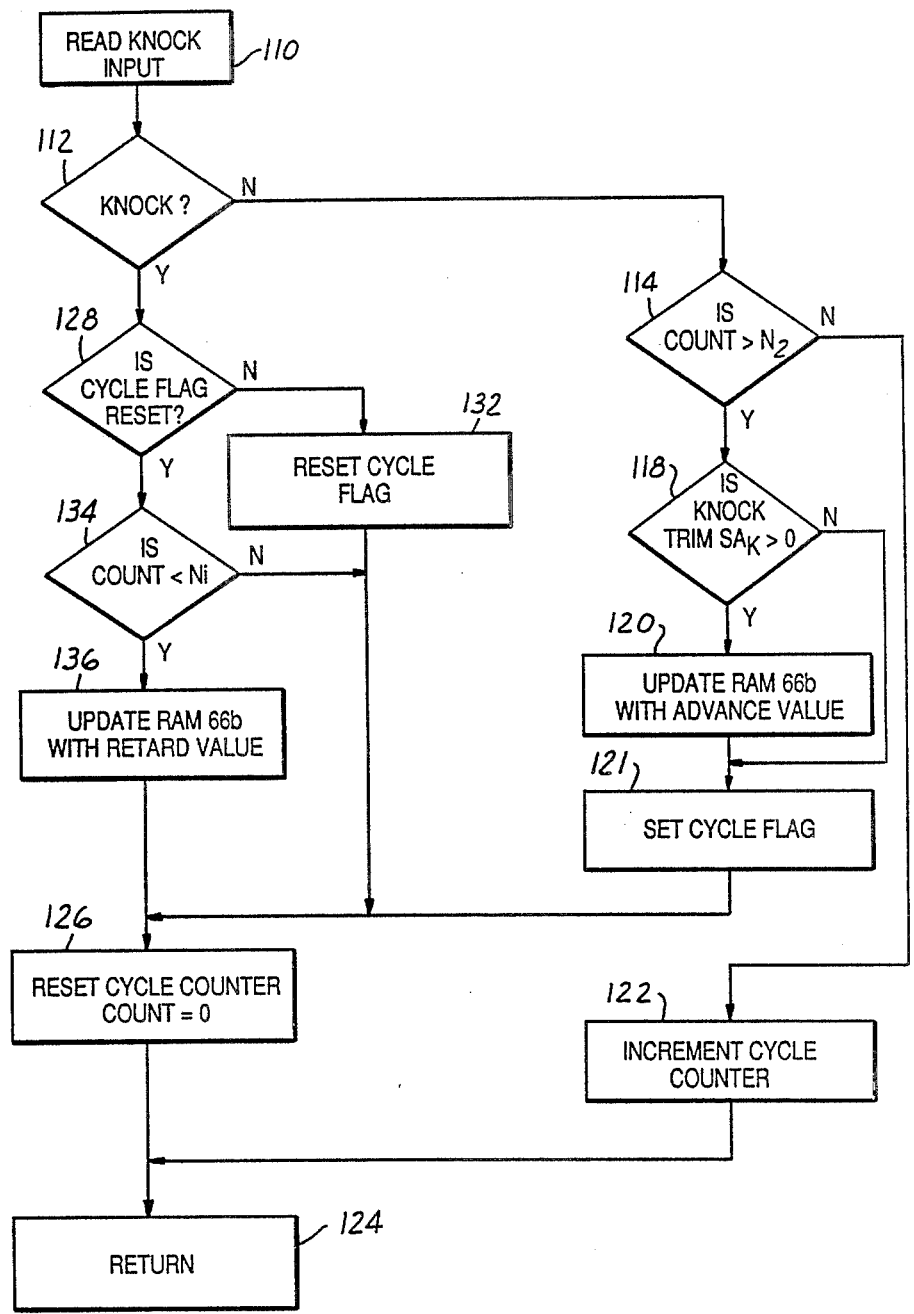
FIG. 5 is a flowchart illustrating various process steps performed by the microcomputer shown in FIGS. 1 and 2 for controlling knock.

Referring now to FIG. 5, and the associated waveforms shown in FIG. 6, a description of knock control strategy is provided. During step 112 microcomputer 10 samples knock comparator 57 for an indication of knock. Assuming for illustrative purposes that knock is not indicated during step 112, the value of cycle counter 122 is then compared to count Nd during step 114. In this particular example, cycle counter 122 counts combustion events between successive knock indications, for each of the cylinders. If $N_2$ cycles occur before the second knock indication, then an advance signal will be generated as described hereinbelow. If the count is not greater than $N_2$, then the cycle counter is incremented and the knock program ended as shown by steps 114, 122, and 124. When the count is greater than $N_2$, and knock trim value $SA_k$ is greater than zero, RAM 66b is updated with a predetermined advance value at the RPM and load points determined in step 82 (see steps 114, 118, and 120). If knock trim $SA_k$ is equal to zero, then the updating step is skipped. Thus, the knock trim value can only be advanced back to zero. Stated another way, advancing the knock trim signal $SA_k$ only proceeds to the accumulated amount of previous retard. The cycle flag is then set in step 121 to indicate that the cycle counter has exceeded count $N_2$. The cycle counter is then reset in step 126 and knock control strategy exited in step 124.

Returning now to step 112 of FIG. 5, the retard branch of the flowchart is described. When knock is indicated by step 112, the cycle flag is checked for a reset condition during step 128. If the cycle flag has not been reset, it is known that a knock has not occurred since count $N_2$ was last reached. Thus, it would not be possible to count the number of engine cycles between two successive knock indications. Accordingly, the cycle flag is then reset during step 132, the cycle counter reset during step 126, and the knock flowchart exited. If the cycle flag had been reset, the cycle count is then checked to see if it is less than $N_1$ during step 134. If the cycle count is less than $N_1$, it is known that the count of cycles between knock indications is less than $N_1$. Accordingly, RAM 66b is updated with the retard value as shown in step 136. Thereafter, the cycle counter is reset and the program exited as shown by steps 126 and 124.

To help better understand the operation of knock control strategy, a graphical illustration of an example of operation is presented in FIGS. 6A-6E. Engine cycles are shown in FIG. 6A and hypothetical knock occurrences shown in FIG. 6B. Referring to FIG. 6C, the cycle counter is shown increasing in value until it reaches count $N_2$ at time $t_O$. At this time an advance signal is provided (see FIG. 6E) and the cycle flag is set. The cycle counter is also reset and commences counting until a knock is detected at time $t_1$. In this particular example, the cycle flag was in the set condition when a knock occurred at time $t_1$ thereby indicating that two successive knock indications have not occurred. Accordingly, even though the count is less than $N_1$ a retard signal is not provided at time $t_1$. The cycle flag and cycle counter are simply reset at time $t_1$. The cycle counter then continues to count engine cycles until a knock occurs at $t_2$. In the example shown herein, the cycle counter has counted beyond count $N_1$ so that a retard signal is not provided. The cycle counter is again reset and continues counting engine cycles until time $t_3$ when another knock indication occurs. For the example shown herein the cycle counter did not reach count $N_1$ at time $t_3$. Accordingly, a retard signal is provided at time $t_3$.

Figure 7:
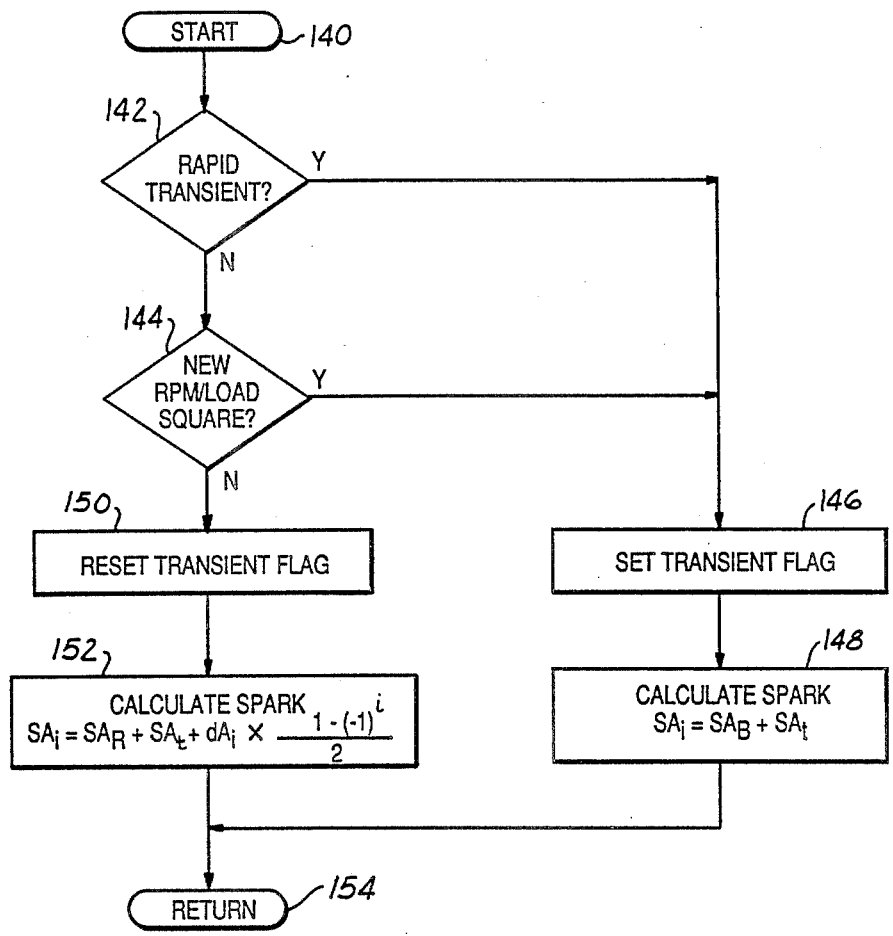
FIG. 7 graphically illustrates various decisions made during knock control processing.
Figure 8:
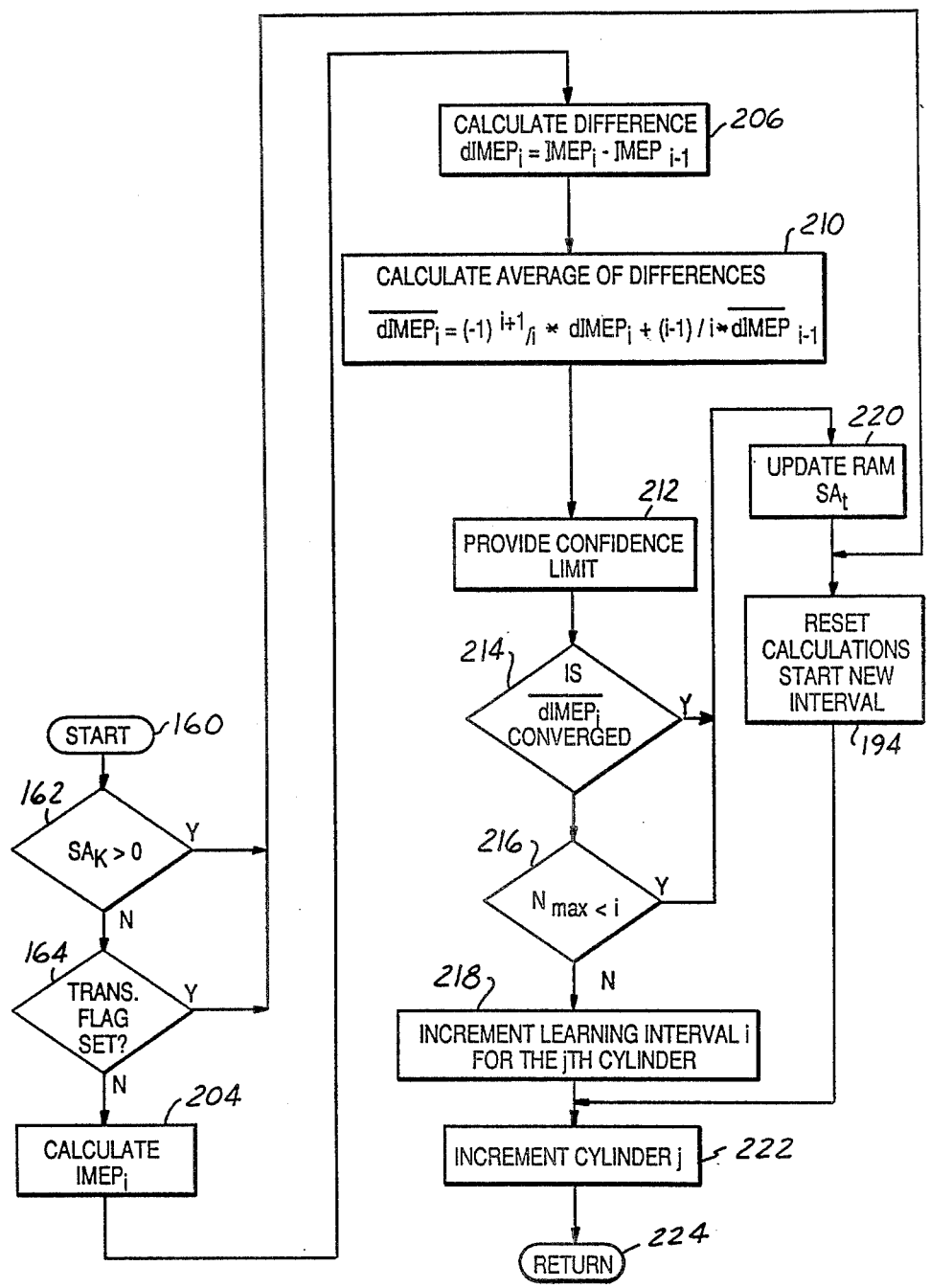
FIG. 8 is a flowchart illustrating various process steps performed by the microcomputer shown in FIG. 1 and 2 during MBT control.

Referring back to FIG. 4, and also referring to FIGS. 7 and 8, a description of MBT ignition control is now provided. First referring to FIG. 4, the flowchart branches at step 92 into retard control or combined MBT and retard control as previously described herein. The retard control has been described with particular reference to FIGS. 5 and 6. During step 92, when knock signal $SA_k$ is equal to zero, the timing offset dA for MBT control is calculated as indicated by step 102. More specifically, the MBT control process shown in FIG. 7 is entered. Engine parameters, including throttle angle signal TA, are monitored to determine whether there are any rapid transients (see step 142). During step 144, engine speed and load are monitored to determine whether they are still within the square of ROM 64 defined by the four SA memory locations which surround the original speed and load points determined in step 82 of FIG. 4. In the event of either rapid transients or a new square, the present learning cycle is bypassed and ignition timing is trimmed in the same manner that it is trimmed during engine control without a learning interval (see steps 146 and 148). During step 152, a predetermined ignition timing offset $dA_i$ is provided for the $i^{th}$ learning interval of the $j^{th}$ cylinder. Ignition timing offset $dA_i$ is only provided for odd learning intervals, otherwise it is set to zero. When a timing offset is utilized, ignition timing is set equal to base ignition signal $SA_R$ plus trim signal $SA_t$ plus offset signal $dA_i$.

Referring back to FIG. 4, the ignition timing is coupled to ignition module 12 and a wait period ensues until combustion in the $j^{th}$ cylinder is completed. During step 98, the knock control strategy is sequenced as previously described herein with particular reference to FIG. 5. Continuing with FIG. 4, after knock control is completed, MBT learning is commenced as described hereinbelow with particular reference to FIG. 8.

Referring now to FIG. 8, knock trim signal $SA_k$ is checked for a value greater than zero and the transient flag is checked for its set condition (see steps 162 and 164). The occurrence of either of these conditions results in a bypass of MBT learning control. More specifically, when knock trim is present, MBT control is disabled. And when the transient flag is set an indication of either rapid transients or operation beyond the original speed and load points is indicated. In either case, MBT learning is bypassed.

As shown in step 204, the indicated mean effective pressure ($IMEP_i$) during the $i^{th}$ learning interval for the $j^{th}$ cylinder is calculated in response to the actual pressure measurement ($P_i$) for the $j^{th}$ cylinder. The difference in IMEP calculations between the previous and present learning intervals for the $j^{th}$ cylinder ($dIMEP_i$) is then calculated (see step 206) for the $i^{th}$ learning interval. During step 210, the average of these differences is determined ($\overline{dIMEP_i}$) utilizing an averaging calculation as follows:

$$\overline{dIMEP_i} = (-1)^{i+1}/i * dIMEP_i + (i-1)/i * \overline{dIMEP_{i-1}}$$

In step 212, a statistical analysis is used to provide a desired confidence level in the above calculation. In this particular example, parametric statistical analysis is used. That is, a number of positive and negative signs of $\overline{dIMEP}$ are counted during the learning cycle. When some preset number $N_{1im}$ of either positive or negative signs is reached, a decision is made that the desired confidence level is achieved and the above calculations have converged.

A determination of $\overline{dIMEP}$ convergence is then made during step 214. In one particular example, the number of signs in one direction $N_{1im}$ is set to 8, after which a correction of RAM 66a table is initiated. The values in RAM 66a are increased to advance ignition timing for positive signs, and decreased to retard ignition timing for negative signs. The four surrounding memory values of the original engine speed and load point are then updated by known extrapolation techniques. The amount of correction is a function of the chosen confidence level. That is, at a lower confidence level a smaller correction to RAM 66a is provided than when the confidence level is set high. In this example, a correction of +1 CA degrees is made to advance RAM table 66a, and −2 CA degrees is made to retard RAM 66a table.

During step 216 a decision is made to prevent the learning system from searching for prolonged periods under conditions in which a decision cannot be made. For example, prolonged searching may occur when the MBT curve is excessively flat, or when there is a large variance in IMEP due to engine operating conditions. In this example, the number of learning intervals is compared to a predetermined number $N_{max}$ such as, for example, 50 learning intervals for the confidence level corresponding to $N_{1im} = 8$. When an indication of excessive searching is provided, RAM 66a is retarded during step 220 as previously described herein. After RAM 66a is updated, all the calculations provided by the previously described steps are reset and a new learning cycle is started (see step 194).

When there is no indication that either $\overline{dIMEP_i}$ has converged or that the maximum number of learning intervals $N_{max}$ has been reached, the learning interval i is incremented for the $j^{th}$ cylinder. Stated another way, the next time a learning interval is called for the $j^{th}$ cylinder, that learning interval will be incremented by one and the process steps described above repeated for the $j^{th}$ cylinder. Cylinder j is also incremented such that the process steps described above are performed for the next cylinder (see step 218 and 222).

In accordance with the above description of MBT control, ignition trim signal $SA_t$ is updated at different speed and load points in RAM 66a for each of the cylinders. Therefore, ignition timing for each cylinder will be operated near MBT regardless of vehicular aging, maintenance performed, and variations in initial manufacturing tolerances.

In accordance with the above description of knock control and MBT control, faster knock control is provided than heretofore possible by making retard decisions in response to a count of engine cycles between two successive knock occurrences. Further, by providing knock corrections only when a minimum count is exceeded, operation with trace knock is enabled thereby optimizing engine power output. In addition, concurrent MBT and knock control are provided through two separate memories thereby providing an advantage of eliminating ignition timing hunting while optimizing engine power output.

This concludes the description of the preferred embodiment. The reading of it by those skilled in the art will bring to mind many alterations and modifications without departing from the spirit and the scope of the invention. The invention may be used to advantage by controlling any engine parameter upon which combustion events are dependant such as ignition timing or the timing of fuel injection. Accordingly, it is intended that the scope of the invention be limited to only the following claims.

What is claimed:

1. A method for controlling ignition timing in a combustion chamber of an internal combustion engine, comprising the steps of:

generating base ignition timing to create an ignition spark within the combustion chamber;

indicating knock occurrence in the combustion chamber;

providing a count of combustion events in the combustion chamber between two successive knock occurrences;

retarding said base ignition timing by a first predetermined increment when said count is less than a first predetermined count; and advancing said base ignition timing by a second predetermined increment when said count is greater than a second predetermined count.

2. The method recited in claim 1 wherein said advancing step is limited to advancing said base ignition timing only to a value which said retarding step has retarded said base ignition timing.

3. The method recited in claim 1 wherein said knock occurrence indicating step comprises measuring pressure within said combustion chamber.

4. A method for controlling ignition timing in a combustion chamber of an internal combustion chamber, comprising the steps of:

detecting knock in the combustion chamber;

generating a separate base ignition timing for each of a plurality of sets of engine speed and load operating conditions;

retarding said base ignition timing a predetermined increment for each of said sets when a first predetermined number of engine cycles occur between two successive knock detections at said engine speed and load operating conditions of said set; and advancing said base ignition timing for said set a second predetermined amount when a second predetermined number of engine cycles occur before a second one of said successive knock detections is detected at said engine speed and load operating conditions of said set.

5. The method recited in claim 4 further comprising the step of trimming said base ignition timing signal in response to a measurement of a combustion parameter to optimize torque output of the combustion chamber.

6. The method recited in claim 5 wherein said combustion parameter comprises pressure in the combustion chamber.

7. The method recited in claim 4 wherein said advancing step is limited to advancing said base ignition timing only to a value which said retarding step has retarded said base ignition timing.

8. A system for controlling ignition timing of a combustion chamber in an internal combustion engine, comprising:

indicating means for providing an indication of knock in the combustion chamber;

ignition means for providing a base ignition timing to the combustion chamber;

counting means for providing a count of cyclical events of the combustion chamber between two successive knock indications; and ignition trim means for retarding said base ignition timing by a predetermined amount when said count is less than a first predetermined count and for advancing said base ignition timing when said count reaches a second predetermined count.

9. The apparatus recited in claim 8 wherein said ignition trim means advances said base ignition timing only to a value to which said base ignition timing has been retarded.

10. The apparatus recited in claim 8 wherein said knock indicating means further comprises a separate pressure sensor for each of the combustion chambers.

11. An apparatus for controlling ignition timing in a combustion chamber of an internal combustion engine, comprising:

detecting means for detecting knock in the combustion chamber;

first storage means for storing a plurality of base ignition timing signals corresponding to an equal plurality of engine speed and load operating points;

trimming means for optimizing torque output of the combustion chamber by providing MBT trim signals in response to a measurement of combustion pressure at each of said speed and load operating points;

second storage means for storing each of said MBT trim signals in storage locations corresponding to said speed and load operating points;

control means for counting combustion events between two successive knock detections at each of said speed and load operating points, said control means providing a retard signal when said count is less than a first predetermined count and providing an advance signal when said count is greater than a second predetermined count;

an accumulator for each of said speed and load operating points, each of said accumulators being incremented by said retard signal and decremented by said advance signal to generate an accumulated knock trim signals; and ignition means for providing the ignition timing to the combustion chamber at each of said speed and load operating points by combining one of said base timing signals from said first storage means and a corresponding one of said MBT trim signals from said second storage means and a corresponding one of said accumulated knock trim signals from a corresponding one of said accumulators.

12. The apparatus recited in claim 11 wherein said trimming means is disabled when said accumulated knock trim value at said speed and load operating points is greater than zero.

13. The apparatus recited in claim 11 wherein said control means provides said advance signal only when said accumulated knock trim signal is present.

* * * * *